(12) United States Patent
Staley, III

(10) Patent No.: US 6,526,648 B1
(45) Date of Patent: Mar. 4, 2003

(54) POSITIONING OF AN OPTICAL DEVICE USING A NON-FORCE-APPLYING EXTERNAL AGENT

(75) Inventor: John Richard Staley, III, Dallas, TX (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/917,482

(22) Filed: Jul. 27, 2001

(51) Int. Cl.⁷ ............................................... H01Q 17/00
(52) U.S. Cl. ...................... 29/601; 29/600; 219/121.85
(58) Field of Search .................... 29/600, 601, 832, 29/834, 836; 219/121.85

(56) References Cited

U.S. PATENT DOCUMENTS

| | | | |
|---|---|---|---|
| 4,410,488 A | 10/1983 | Gessinger et al. | 419/48 |
| 5,026,441 A | 6/1991 | Kim et al. | 148/402 |
| 5,135,517 A | 8/1992 | McCoy | 604/281 |
| 5,536,126 A | 7/1996 | Gross | 411/411 |
| 5,645,520 A | 7/1997 | Nakamura et al. | 600/151 |
| 5,881,198 A * | 3/1999 | Haake | 385/136 |
| 6,181,459 B1 | 1/2001 | LaFiandra | 359/290 |

* cited by examiner

Primary Examiner—Charles G. Freay
Assistant Examiner—Emmanuel Sayoc
(74) Attorney, Agent, or Firm—William C. Schubert; Glenn H. Lenzen, Jr.

(57) ABSTRACT

An optical device is positioned by mounting the optical device in a support formed at least in part of a support material which is capable of controllable and permanent mechanical deformation by a non-force-applying agent. Examples of such support materials include shape memory alloys, composite materials, and materials having a residual stress therein. The optical device is mounted to the support in a first position, and then the support is controllably and permanently locally deformed by the non-force-applying agent to reposition the optical device to a second position. The non-force-applying agent is preferably local heating, as with a laser.

23 Claims, 3 Drawing Sheets

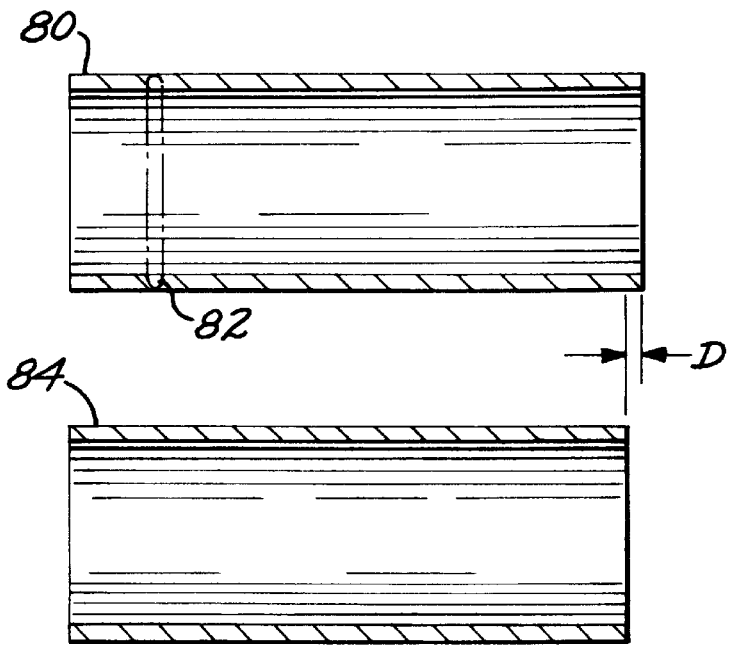
FIG.4
FIG.5
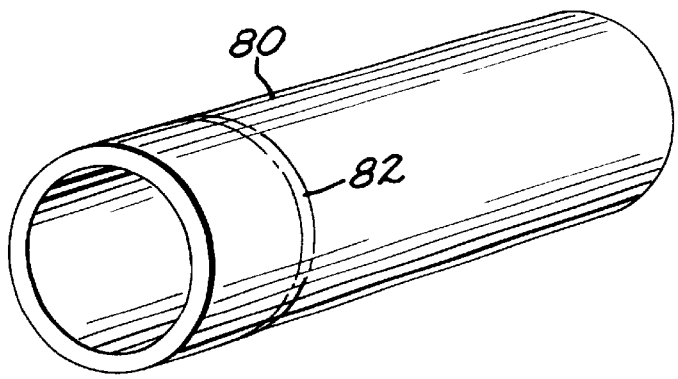
FIG.6
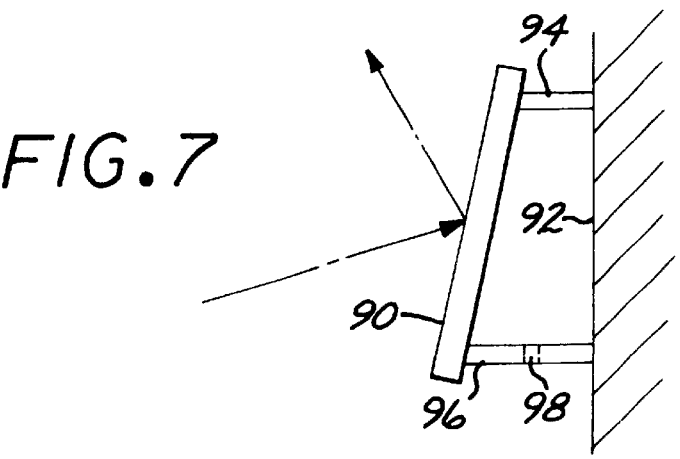
FIG.7

POSITIONING OF AN OPTICAL DEVICE USING A NON-FORCE-APPLYING EXTERNAL AGENT

This invention relates to optical devices and, more particularly, to the precise mechanical positioning of mechanical devices in an optical assembly.

BACKGROUND OF THE INVENTION

Optical assemblies typically include mirrors, lenses, and/or other optical elements that produce, utilize, modify, and direct light rays. The light rays are often employed in precisely defined beams. It is therefore necessary that the optical elements be precisely positioned relative to each other. Positions, including both angular orientations in space and lateral positioning, must be precisely established and maintained to within very fine physical tolerances in order to properly align the optical device.

In a laboratory setting, it is usually possible to use optical mounts with mechanical adjustments that provide the precise positioning within the desired tolerances. In a production optical device, however, such laboratory mounts may be far too bulky and heavy. The optical elements are therefore mounted in supports that are machined to precise dimensions and tolerances. In many cases, the required extremely high tolerances push the limits of available machining technology. Consequently, the cost of such supports that require high precision, and the resulting optical devices, tends to be high. In order to maintain costs within desired limits, it is sometimes necessary to compromise the optical performance of the optical device.

There is a need for an improved approach to the adjustable support of optical elements within optical devices that is useful for production optical devices and also has an acceptable cost. The present invention fulfills this need, and further provides related advantages.

SUMMARY OF THE INVENTION

The present invention provides a method and structure to achieve the precise positioning of an optical device. The approach allows the optical device to be approximately positioned, and then the position is fine tuned by a non-force-applying approach to achieve precise optical alignment of the optical device. The positioning may be of any required type, either angular, displacement, or a combination thereof. No substantial weight or bulk are added to the structure by the use of the present approach. The present approach is readily applied in a mass-production environment with acceptable costs. The precise optical alignment is stably retained during service.

In accordance with the invention, a method for positioning an optical device comprises the steps of providing an optical device, providing a support comprising a support material which is capable of controllable and permanent mechanical deformation by a non-force-applying agent, and mounting the optical device to the support in a first position. The method further includes controllably and permanently locally deforming the support by the non-force-applying agent to reposition the optical device to a second position. The deforming is desirably accomplished by local heating, as with a laser heating pulse.

The support material is preferably a metal such as a shape memory alloy. It may be another type of metal that exhibits a phase transformation at a transformation temperature which produces a volume or shape change. The support material may also be a material having a residual stress therein which may be altered. Composite materials may also be used. The support material may also be a material that is mechanically deformed and/or otherwise altered by an applied magnetic field.

The optical device may have one, two, or more than two optical elements. Where there is more than one optical element, the step of controllably and permanently locally deforming includes the step of repositioning the optical elements relative to each other.

The step of controllably and permanently locally deforming may be accomplished in several stages. Thus, for example, the step may include first controllably deforming the support, and thereafter second controllably deforming the support to a final permanently deformed state. The success of the first controllable deformation is assessed, and then the second controllable deformation is performed as needed.

The present approach is based on the selection of the deformable support material to constitute at least a part of the support. The deformable support material may form the entire support, or only a part of the support. A separate positioning and adjustment structure is therefore not needed, so that no substantial weight or bulk is added to the optical device structure.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 4 is a sectional diagram of a tubular support made of the support material, prior to precise positioning;

FIG. 5 is a sectional diagram of the tubular support of FIG. 4, after precise positioning;

FIG. 6 is a perspective view of the tubular support of FIG. 4; and

FIG. 7 is an elevational view of a mirror optical device using tubular supports.

DETAILED DESCRIPTION OF THE INVENTION

Figure 1:
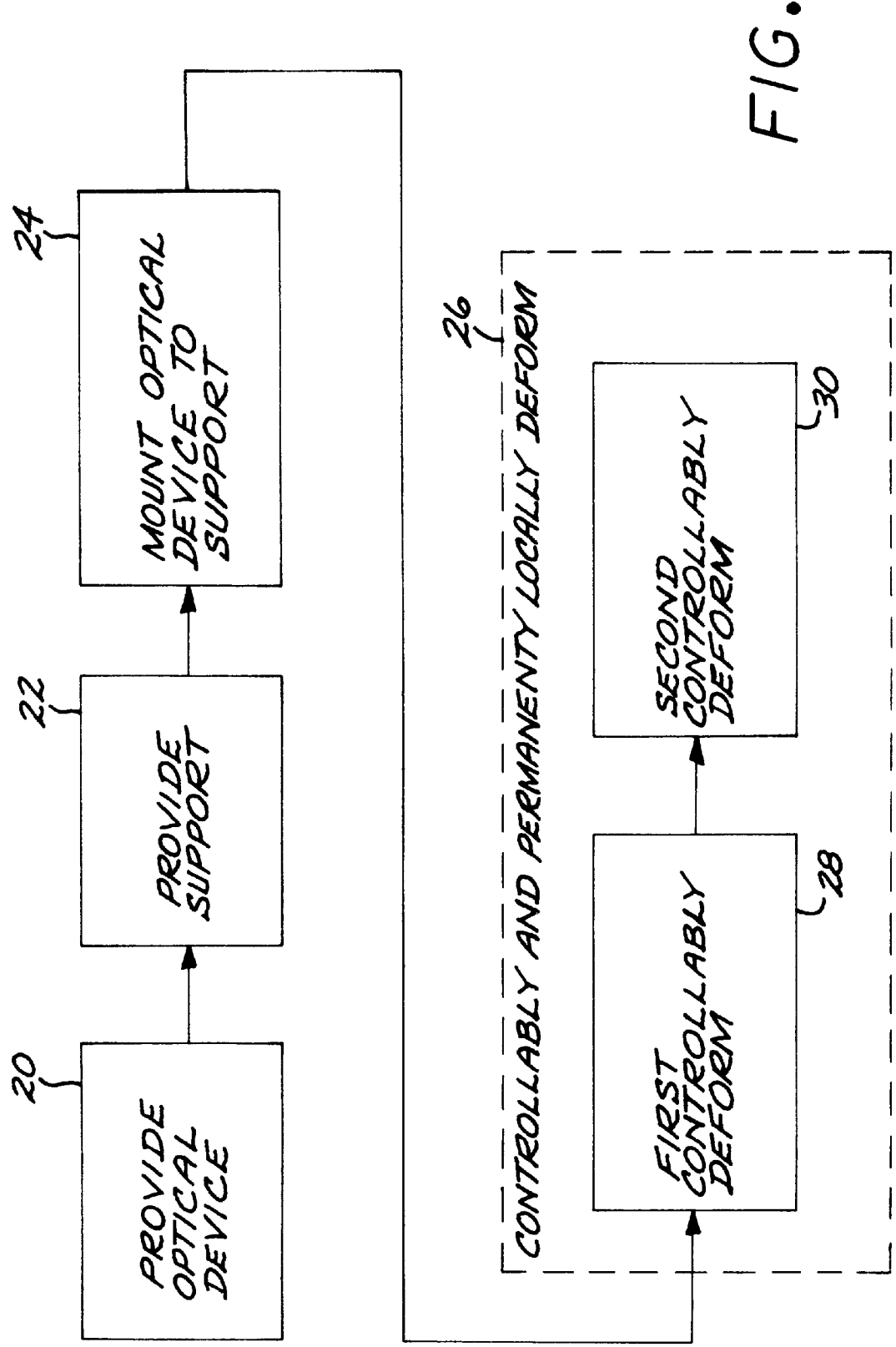
FIG. 1 is a block diagram of a preferred method for practicing the invention.

FIG. 1 depicts a method for practicing the invention. FIGS. 2–3 and 4–7 illustrate two exemplary physical embodiments of the invention. These embodiments are presented as examples of the manner in which the invention may be used, and are not limiting of the invention or its applications.

An optical device is provided, numeral 20. The optical device may be of any operable type, and may contain one, two, or more individual optical elements. Examples of optical elements include mirrors, lenses, optical fibers, optical waveguides, beam splitters, polarizers, non-linear optical elements, diffraction elements, filters, amplifiers, and the like, but this list is exemplary and not limiting.

Figure 2:
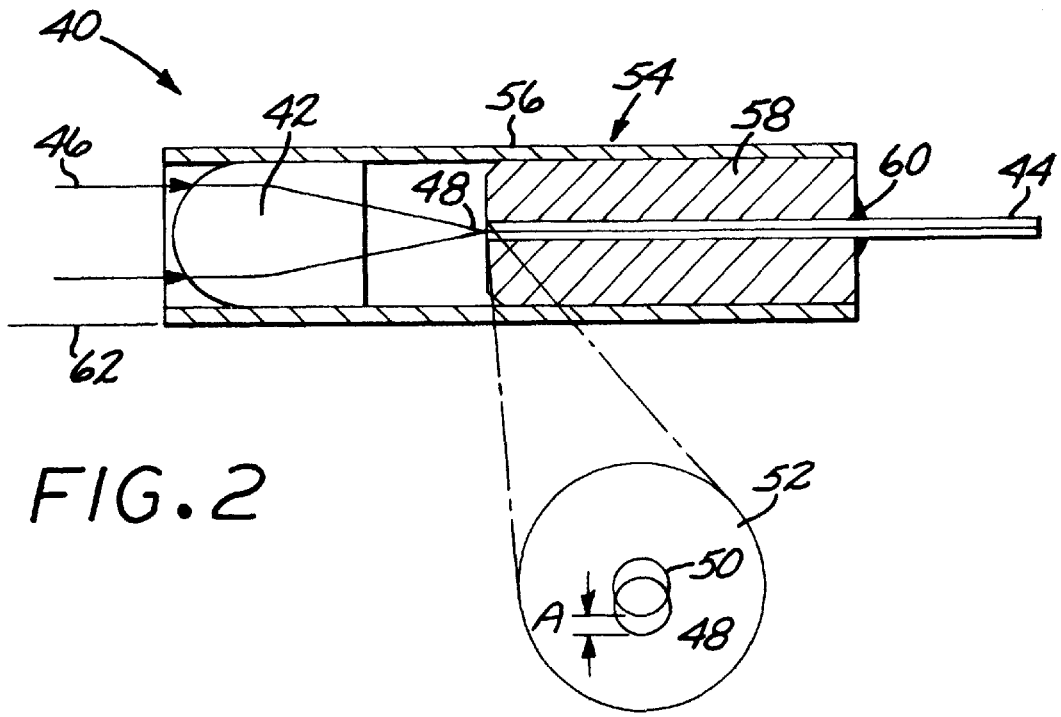
FIG. 2 is a schematic diagram of an optical device, prior to precise positioning, with an enlarged inset showing the relation of the optical fiber core and the light beam.
Figure 3:
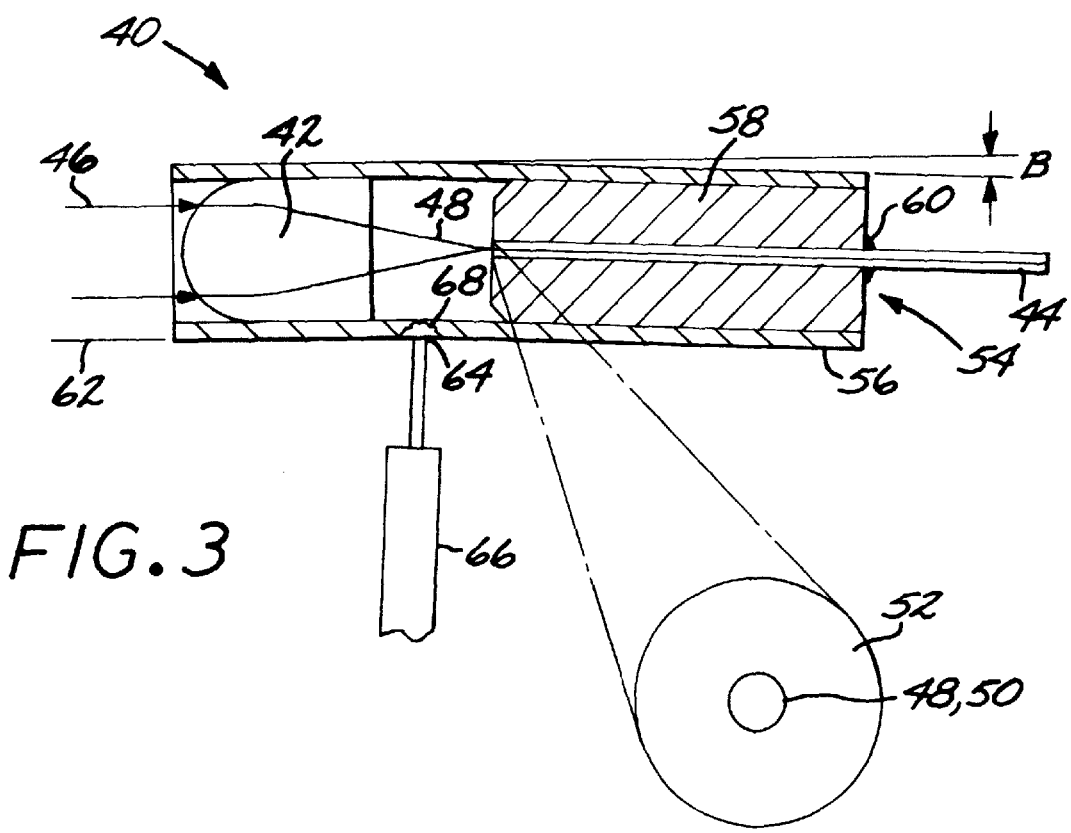
FIG. 3 is a schematic diagram of the device of FIG. 2, after precise positioning, with an enlarged inset showing the relation of the optical fiber core and the light beam.

The optical device 40 of FIGS. 2–3, which is used for illustration, has a collimating lens 42 and an optical fiber 44. The collimating lens 42 receives a beam of incident light 46 and collimates a refracted beam 48 onto the end of the optical fiber 44. The inset of FIG. 2 shows the end of the optical fiber 44 with its core 50 and its cladding 52. In the absence of proper positioning, the refracted beam 48 is slightly misaligned with the core 50 of the optical fiber 44 by a displacement A, resulting in a partial or complete loss of light intensity coupled into the core 50 of the optical fiber 44. It is therefore necessary to reposition the refracted beam 48 so as to be precisely aligned with and coincident with the core 50. This repositioning is achieved by introducing an angular repositioning of the collimating lens 42 relative to the optical fiber 44. The angular positioning must be quite precise, to within tens of microradians or better.

To accomplish the angular repositioning according to the present approach, a support 54 is provided, numeral 22. In this case, the support 54 includes a support tube 56 made entirely of a support material, although in other embodiments only a portion of the support tube is made of the support material. The support material is preferably a metallic alloy, most preferably a shape memory material. Shape memory materials are a known class of metallic alloys that are used for other applications. See, for example, U.S. Pat. Nos. 4,410,488, 5,026,441, and 5,536,126. The property of interest of such a material in relation to the present invention is its shape change after being deformed to a deformed state at a lower temperature below a shape-memory transformation temperature, and then heated to a higher temperature above the shape-memory transformation temperature to change to a recovered state. (The shape-memory transformation temperature is characteristic of the selected shape memory alloy used in the support tube 56, and is known for each such material.) The support tube 56 is prepared by rolling, extruding, drawing, or other tube-forming technique at a temperature below the shape-memory transformation temperature for the selected alloy.

The optical device 40 is mounted to the support 54, numeral 24. In the illustrated case, the collimating lens 42 is cemented to the inside of the support tube 56. The optical fiber 44 is joined to the support tube 56 using a ferrule 58 with a strain relief 60 between the optical fiber 44 and the ferrule 58. An effort is made to align the collimating lens 42 with the optical fiber 44 parallel to a mounting axis 62 when these components are assembled to the support tube 56. However, as depicted in the insert of FIG. 2, inevitably there is some angular misalignment that requires further repositioning and fine adjustment.

The angular repositioning is achieved by controllably and permanently locally deforming the support 54, and specifically the support tube 56, numeral 26. This deforming is accomplished in a non-force-applying manner by a non-force-applying agent. That is, no external mechanical force is applied to the support 54 to accomplish the positioning and permanent deforrning. (The term "non-force-applying" includes the situation where there is no contact and also the situation where there is a slight, incidental force arising from contact, as where a heater is wrapped around the support, but such a slight, incidental force does not itself permanently deform the support.)

To accomplish this deforming, the support tube 56 is locally heated in a region 68, preferably by a locally directed laser heating pulse 64 produced by a laser 66. Other heating sources such as an electron beam may be used instead, but the laser is preferred because it is precisely controllable in both position, beam spot size, and heating input, and also is used in air.

In the case of the shape memory alloy support tube 56, the locally heated region 68 is heated above the shape-memory transformation temperature. The region 68 heated in this manner controllably permanently shortens in length as a result of this heating to the temperature above the shape-memory transformation temperature, causing the tube to bend by the angle B as seen in FIG. 3. The position of the refracted beam 48 is angularly shifted and repositioned as a result. Angle B desirably produces a displacement in the position of the refracted beam 48 that is the inverse of the displacement A at the end of the optical fiber 44. The refracted beam 48 thus becomes exactly coincident with the core 50 of the optical fiber 44 as illustrated in FIG. 3, and with the refracted beam 48 and the core 50 extending parallel to the mounting axis 62.

However, it may be necessary to go through several iterations in order to reach the illustrated desired result, if angle B of the first controllable deformation is not precisely what is needed to correct the displacement A shown in FIG. 2. As seen in FIG. 1, there may be a first controllable deformation 28 in a first local region followed by a second controllable deformation 30 in a second local region as part of step 26. The degree of alignment is optically assessed after the first controllable deformation 28, and the second controllable deformation 30 applied as a final correction. As many steps of the type of steps 28 and 30 may be applied as necessary, with the region 68 shifted in position for each of the steps.

The application of FIGS. 2–3 illustrates an angular repositioning using the present approach. Longitudinal positioning may also be accomplished. FIGS. 4–6 depict a support tube 80 (or portion thereof) made of the support material prepared in the manner discussed earlier. A circumferential local region 82 is heated, using for example a laser or a circumferentially wound resistance heater, so that the local region 82 shortens in length by an amount D, producing the shortened support tube 84 of FIG. 5.

FIG. 7 illustrates the application of the longitudinal positioning as depicted in FIGS. 4–6. A mirror 90 is supported from a base 92 by two support tubes 94 and 96. (There may be more than two support tubes, and the use of three support tubes arranged triangularly is common.) One or more of the supports 94, 96 is made at least in part of the support material. Upon local heating in the circumferential region 98, the heated support 96 shortens, changing the position and orientation of the mirror 90.

The invention has been reduced to practice using the structure illustrated in FIGS. 2–3. The support material was Ti-Ni (nitinol) shape memory alloy having a shape-memory transformation temperature of about 100° C. The deformation of the support material was induced by the application of localized heating of the support material. Two methods of heating were demonstrated, although others could be used as appropriate. A first method used a laser pulse to provide a quick burst of heat localized at the point of laser beam incidence, the region 68. The amount of tuning and eventual transformation of the support material was controlled via the power and duration of the pulse. The support material responded to the localized heating with a transitory thermal expansion and contraction response and a long-term deformation component arising from the material's temperature locally exceeding the shape-memory transformation temperature. A second method achieved similar results using contact heating by a hot probe tip placed into light localized contact with the support material. The force of contact was insufficient to cause mechanical deformation and hence is not considered as the agent of deformation. The amount of deformation was controlled by the duration of contact and the temperature of the heating probe. Again the support material exhibited both transitory thermal expansion and contraction as well as permanent deformation. Contact heating is useful in cases where the heaters may be incorporated within or at the surface of the support material.

The preceding discussion focused on the use of the shape memory alloy as the support material. Other materials may be used instead of the shape memory alloy. For example, some composite materials exhibit a permanent deformation upon heating and subsequent cooling. The composite materials are formed of two or more different materials, at least one of which exhibits a dimensional change following heating above a threshold temperature and then cooling. The composite material may be, for example, a tube of a first material such as a nonmetallic resin having an overlying layer of another material such as a nickel alloy that exhibits the permanent dimensional change upon heating and cooling, a structure of metal or other fibers in a matrix of another metal with the structure permanently deforming by a hysteresis effect upon heating and cooling, or a structure that is at least partially metallic and exhibits an environmentally stable hysteresis. Other materials exhibit a phase transformation having an associated dimensional and volume change. If these deformations or phase transformations are accomplished locally, the surrounding material constrains the free movement of the altered region with the result that there is a permanent deformation that may be used to reposition the support structure as discussed earlier. In yet another approach, a material with a residual stress may be locally stress-relieved to change its dimensions.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for positioning an optical device, comprising the steps of:
   providing an optical device;
   providing a support comprising a support material which is capable of controllable and permanent mechanical deformation by a non-force-applying agent;
   mounting the optical device to the support in a first position; and
   controllably and permanently locally deforming the support by the non-force-applying agent to reposition the optical device to a second position.

2. The method of claim 1, wherein the step of providing a support includes the step of
   providing a support material which is a metal.

3. The method of claim 1, wherein the step of providing a support includes the step of
   providing a support material which is a shape memory alloy.

4. The method of claim 1, wherein the step of providing a support includes the step of
   providing a support material which is a composite support material.

5. The method of claim 1, wherein the step of providing the support includes the step of
   providing a support material which exhibits a phase transformation at a shape-memory transformation temperature, and wherein the step of controllably and permanently locally deforming includes the step of
   heating the support material to a temperature above the shape-memory transformation temperature.

6. The method of claim 1, wherein the step of providing a support includes the step of
   providing a support material having a residual stress therein.

7. The method of claim 1, wherein the step of controllably and permanently locally deforming includes the step of
   locally heating the support material.

8. The method of claim 1, wherein the step of controllably and permanently locally deforming includes the step of
   heating the support material using a laser heating pulse.

9. The method of claim 1, wherein the optical device comprises exactly one optical element.

10. The method of claim 1, wherein the optical device comprises at least two optical elements, and wherein the step of controllably and permanently locally deforming includes the step of
    repositioning the optical elements relative to each other.

11. The method of claim 1, wherein the step of controllably and permanently locally deforming includes the step of
    first controllably deforming the support, and thereafter
    second controllably deforming the support to a final permanently deformed state.

12. A method for positioning an optical device, comprising the steps of:
    providing an optical device;
    providing a support comprising a shape memory alloy in a first deformation state;
    mounting the optical device to the support in a first position; and
    controllably and permanently locally deforming the support by locally heating the shape memory alloy to a temperature above its shape-memory transformation temperature to locally transform the shape memory alloy and thereby reposition the optical device to a second position.

13. The method of claim 12, wherein the step of controllably and permanently locally deforming includes the step of
    heating the support material using a laser heating pulse.

14. The method of claim 12, wherein the optical device comprises exactly one optical element.

15. The method of claim 12, wherein the optical device comprises at least two optical elements, and wherein the step of controllably and permanently locally deforming includes the step of
    repositioning the optical elements relative to each other.

16. The method of claim 12, wherein the step of controllably and permanently locally deforming includes the step of
    first controllably deforming the support, and thereafter
    second controllably deforming the support to a final permanently deformed state.

17. The method of claim 1, wherein the step of providing the support includes the step of
    providing a tubular support.

18. The method of claim 1, wherein the step of controllably and permanently locally deforming includes the step of
    controllably and permanently locally deforming the support material by the non-force-applying agent to reposition the optical device to a second position.

19. The method of claim 1, wherein the step of providing the support includes the step of
    providing the support made entirely of a shape memory alloy.

20. The method of claim 5, wherein the step of providing the support includes the step of providing the support material as is a shape memory alloy.

21. The method of claim 12, wherein the step of providing the support includes the step of providing a tubular support.

22. The method of claim 12, wherein the step of providing the support includes the step of providing the support made entirely of the shape memory alloy.

23. A method for positioning an optical device, comprising the steps of:

providing an optical device;

providing a tubular support made of a shape-memory-alloy support material;

mounting the optical device to the tubular support in a first position; and controllably and permanently locally deforming the tubular support by locally heating the shape-memory-alloy support material of the tubular support to a temperature above its shape-memory transformation temperature to locally transform the shape memory alloy and thereby reposition the optical device to a second position.

* * * * *